Nov. 19, 1968  E. B. CHILDS  3,411,357
POSITIVE CRANKCASE VENTILATION TESTER
Filed Nov. 17, 1967
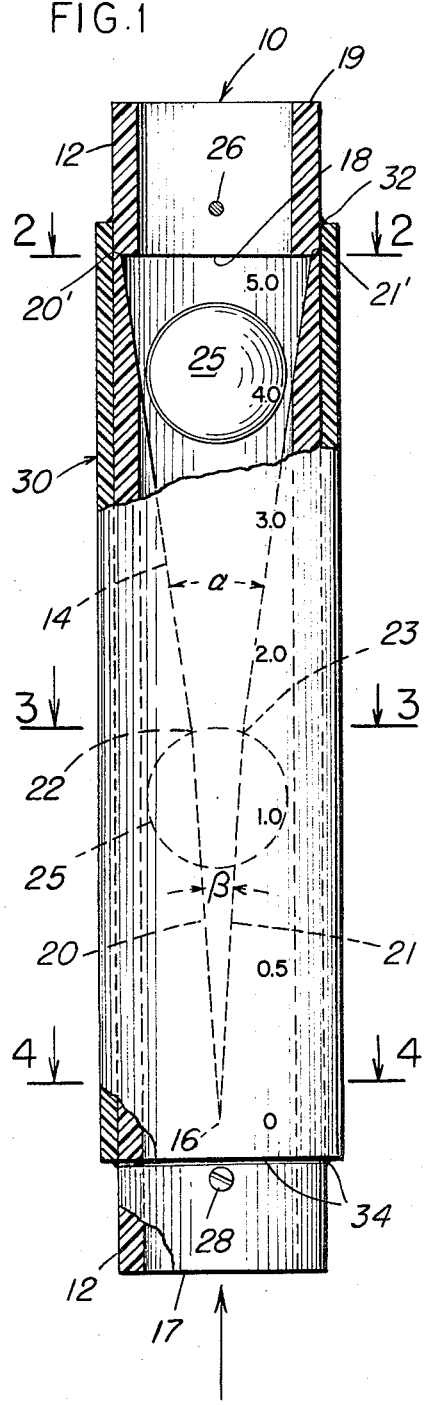
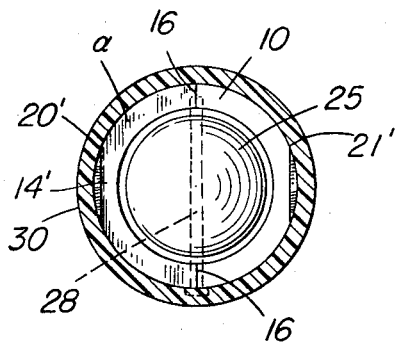
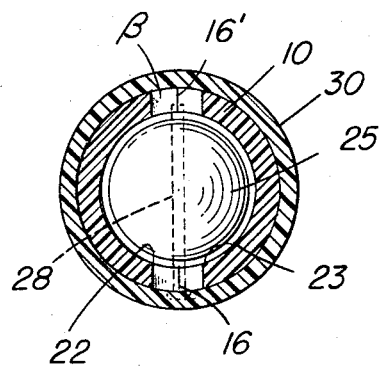
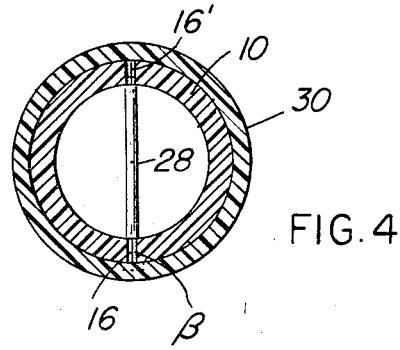
INVENTOR.
Elbert B. Childs
BY
Agent

United States Patent Office 3,411,357
Patented Nov. 19, 1968

3,411,357
POSITIVE CRANKCASE VENTILATION TESTER
Elbert B. Childs, Hastings-on-Hudson, N.Y., assignor to
Mobil Oil Corporation, a corporation of New York
Filed Nov. 17, 1967, Ser. No. 684,067
8 Claims. (Cl. 73—209)

ABSTRACT OF THE DISCLOSURE

A flow meter useful in measuring the rate of gas flow is constructed of two concentric tubes wherein the inner tube has a V-shaped slot oriented parallel to the longitudinal axis of the tube, the sides of which have a variation in slope; and an outer tube telescoped over the inner one. A low density sphere is freely movable and retained within the inner tube. In use, the instrument is positioned vertically so that the apex of the V-shaped slot points downwardly and gas is passed upwardly through the tube. The movement of the sphere in the tube is a measure of the rate of gas flow. The variation in slope of the V-shaped slot results in a non-linear instrument wherein there is a relatively large displacement of the sphere at a low gas flow rate and a progressively smaller displacement of the sphere as the gas flow rate increases. The instrument may be employed to advantage in the testing of positive crankcase ventilation systems.

Background of the invention

The present invention relates to an instrument for measuring the rate of flow of gases and liquids and more specifically to simplified apparatus that may be used by a mechanic or service station attendant to test the positive crankcase ventilation (P.C.V.) system of an automobile.

There has been an increasing public concern about pollution of the atmosphere as a result of the increase of respiratory diseases and smog conditions that trouble residents of the more populous areas. As the number of automobiles in daily use continues to increase, a great deal of this concern is directed to the pollution that results from fumes and vapors generated by internal combustion engines. In the past, crankcase vapors, which consist of blowby materials made up of combustion residues and unburned or partially burned air fuel mixture; engine oil in mist or droplet form, and air introduced for engine ventilation purposes, have been vented directly into the atmosphere through a ventilation draft tube that communicates with the crankcase. However, Federal Law will soon require automobile manufacturers to install at the factory on all new automobiles a positive crankcase ventilation system.

Positive crankcase ventilation systems that comply with Federal standards operate on the principle of returning the crankcase vapors to the engine. One system returns crankcase vapors directly to the inlet manifold, using the pressure differential created by manifold vacuum. The flow rate is controlled by a ventilation valve that is located at the intake manifold. This system is described in SAE (Society of Automobile Engineers) Bulletin No. 670,498, Emission Control Devices Demand Improvement in Test Techniques and Motor Oils (F. E. Ghannam et al.), May 15–19, 1967, pp. 1–3. Other systems return the vapors to the carburetor by way of the air cleaner; or the vapor flow is divided, a part being directed to the inlet manifold, and another part being directed through the air cleaner to the carburetor. A check valve may be used to control the vapor through each path.

The flow meter of the present invention is useful in testing positive crankcase ventilation systems. It is an advantage of the instrument of the present invention that one can measure both crankcase blowby and the air flow into the crankcase. The ability to measure these two parameters with a single instrument provides the data necessary to properly evaluate a positive crankcase ventilation system over an extended period.

Summary of the invention

In accordance with the present invention a flow meter is constructed of a vertical cylindrical inner tube provided at its lower end with an inlet and with diametrically opposed V-shaped openings or slots positioned parallel to the longitudinal axis of the tube. A second tube surrounds the inner tube and the opposed V-shaped slots, and the ends of the second tube are sealed to the walls of the inner tube. A moveable sphere is retained within the inner tube, the diameter of said sphere being but a little smaller than the inner diameter of the tube, whereby gas flowing upwardly through the inner tube will cause the sphere to rise a distance that is related to the rate of gas flow.

Brief description of the drawing

The construction and operation of the instrument of the present invention will become apparent from the description which follows, taken in connection with the accompanying drawings, in which:

FIG. 1 is a side view of a flow indicator constructed in accordance with this invention;

FIG. 2 is a cross-sectional view on the line 2—2 of FIG. 1;

FIG. 3 is a cross-sectional view of the line 3—3 of FIG. 1; and

FIG. 4 is a cross-sectional view on the line 4—4 of FIG. 1.

Description of the preferred embodiment

As illustrated in FIG. 1, a flow meter that is especially adapted to accurately determine the rate of gas flow over a range of 0.1 to 6 cubic feet per minute, may include a rigid cylindrical tube 10, the wall 12 thereof being provided with V-shaped slot 14 that extends parallel to the longitudinal axis of the tube from the apex 16 of the slot spaced from the lower end 17 of the tube to the base 18 of the slot spaced from the upper end 19 of the tube. The slot 14 is formed with a variable taper in that the divergence of the edges 20 and 21 of the slot between the apex and points 22 and 23 approximately midway between the ends 17 and 19 of the tube, is less than the divergence of the edges of the slot between the points 22 and 23 and the base of the slot. Thus each edge of the slot 14 diverges from a plane parallel to the longitudinal axis of the tube at an angle $\alpha$, to a point approximately midway between the end of the tube and diverges from that point at a larger angle $\beta$ to the base of the slot.

A second V-shaped slot 14′ having an apex 16′ and edges 20′ and 21′ is formed in the wall of the tube diametrically opposite the first slot and in alignment therewith. The shape and size of this second slot may be identical with that of the first slot.

A moveable flow indicator 25 in the form of a hollow sphere, the diameter of which is slightly smaller than the internal diameter of the tube 10 is placed in the tube and retained therein by screws 26 and 28 that are threaded into the wall 12 and project into the tube to form stops at either end thereof. Screws 26 and 28 can also be transverse nylon rods (⅛"). These stops prevent the center of the sphere 25 from dropping below the apex of the slot 14 or rising above the base thereof.

The tube 10 is surrounded by a second rigid cylindrical tube 30, the length of which is greater than the length of the slot 14. The tube 30 has an internal diameter that is but slightly greater than the external diameter of the tube 10, and is telescoped over the tube 10 to cover the entire length of the slot 14 as will be apparent from FIGS. 1 and 2.

The close frictional fit between the concentric tubes, together with annular seals 32 and 34 formed between the ends of the tube 30 and the exterior wall of the tube 10 insures that the sole gas flow effecting movement of the sphere is that flow of gas which passes axially through the tube 10 in the direction of the arrow in FIGURE 1.

The rigid tubes 10 and 30 may be constructed of a high impact resistant plastic. A transparent plastic material such as methyl methacrylate resin is particularly preferred as the position of the sphere in the tube may be easily visualized. To cover a range of 0.1 to 5.0 cubic feet per minute, the tube 10 may appropriately have an internal diameter of 1.5 inches, an external diameter of 2.0 inches and a length of 11.31 inches. The tube 30 may have an internal diameter of 2.0 inches, an external diameter of 2.25 inches and a length of 9.06 inches. While the dimensions of the V-shaped slot are not critical it has been found to facilitate the accurate testing of all types of positive crankcase ventilation systems to have the displacement of the sphere when the gas flow rate changes from 0.1 to 1.0 cubic feet per minute greater than the movements of the sphere when the gas flow rate changes from 1.0 to 2.0 cubic feet per minute. This non-linear relationship between the rate of gas flow and the movement of the sphere will be approximated when the tubes 10 and 30 are dimensioned as described above and the slot 14 has the following dimensions:

Distance from lower end 17 of tube to apex of slot—1.5 inches.

Distance from apex of slot to the points 22 and 23—3.75 inches.

Distance from points 22 and 23 to the base of the slot—4.6 inches.

Distance between the points 22 and 23—0.44 inch.

Width of the base of the slot 2.5 inches.

The sphere used with this device may be a "tournament quality" ping-pong ball constructed of celluloid and having a weight of 2.53 grams and a diameter of 1.496 inches.

The tube 30 is graduated from 0 to 5 cubic feet per minute and is graduated from 0.1 cubic feet per minute to 1 cubic foot per minute in increments of 0.1 cubic feet per minute, since the positive crankcase ventilation system for most engines will test between 0.2 and 1.0 cubic feet per minute air flow into the crankcase through the oil fill hole under idle conditions.

In use the flow meter is placed in a vertical position as shown in FIGURE 1. A suitable adaptor and a flexible conduit such as a length of rubber tubing is used to connect the end 17 of the tube to the source of gas flow to be measured. To determine the operation of any positive crankcase ventilation system on an automobile, the engine is warmed up and checked over its entire range of speed from idle to full throttle by connecting the lower end 17 or the upper end 19 of the flow meter to the oil fill hole in the crankcase or rocker box cover. When connected to the lower end of the flow meter, any upward movement of the sphere will indicate the flow rate of gases emanating from the crankcase (blowby). When connected to the upper end of the flow meter, any upward movement of the sphere will indicate the flow rate of air drawn into the crankcase (suction). It is a useful check on the operation of the positive ventilation system to take one reading of the flow meter at an intake manifold vacuum of 4 inches. This is readily done in a car with automatic transmission without harm to the engine or transmission by pulling against the brake briefly. No blowby indicates a properly operating P.C.V. system.

The amount of crankcase blowby will change as an internal combustion engine ages and wears. The flow meter of the present invention may be used to determine the size of the valve that should be used in the P.C.V. system to minimize vapor flow out of the crankcase. With the flow meter connected as described above, the engine is operated over its entire range while pinching the positive crankcase ventilation valve tube to block off all flow. The maximum reading of the flow meter will determine the size valve to be installed.

Excessive ventilation of the engine crankcase is also undesirable because it will aggravate oil consumption.

From the foregoing it will be evident that a flow indicator constructed in accordance with this invention fulfills to a marked degree the requirements of an instrument for testing positive crankcase ventilation systems.

What is claimed is:

1. An indicator comprising
    a first rigid cylindrical tube;
    a first V-shaped slot in the wall of said tube, the sides of which meet at an apex spaced from one end of the tube and diverge from a plane parallel to the longitudinal axis of the tube at an angle $\alpha$ to a point that is approximately midway between the ends of said tube, and diverge from said point at a larger angle $\beta$ to a base that is parallel with the other end of said tube and spaced therefrom;
    a second V-shaped slot in the wall of said tube, said second slot being diametrically opposite said first slot;
    a sphere freely moveable within said tube and retained therein by stops that extend into the tube below the apex and above the base of said slots;
    a second rigid transparent cylindrical tube having a length greater than said slots and an internal diameter slightly larger than the external diameter of said first tube, said second tube being positioned concentrically with respect to said first tube so that the ends thereof extend beyond the apex and base of the slots and both ends of said second tube being sealed to the exterior wall of the first tube; whereby said sphere is lifted varying amounts in accordance with the rate of flow of fluid through said first tube.

2. An indicator of claim 1 wherein the first and second cylindrical tubes are constructed of a high-impact plastic material.

3. An indicator of claim 1 wherein the second cylindrical tube is formed of methyl methacrylate resin.

4. An indicator of claim 1 wherein the sphere is formed of plastic.

5. An indicator of claim 1 wherein the sphere is hollow.

6. An indicator of claim 5 wherein the sphere is constructed of plastic.

7. An indicator of claim 1 wherein the second V-shaped slot is identical in shape and size to said first slot.

8. A flow meter having the structure defined by claim 1 wherein one of said cylindrical tubes is graduated.

References Cited

UNITED STATES PATENTS

| | | | |
|---|---|---|---|
| 1,889,705 | 11/1932 | Sherwood | 73—209 |
| 2,003,474 | 6/1935 | Schweitzer | 73—208 |
| 2,137,102 | 11/1938 | Terrell | 116—117 X |
| 2,400,108 | 5/1946 | Elowson | 73—208 |
| 3,182,500 | 5/1965 | Ishii | 73—209 |
| 3,330,248 | 7/1967 | Cornell | 73—116 X |

RICHARD C. QUEISSER, *Primary Examiner.*

JERRY W. MYRACLE, *Assistant Examiner.*